(12) United States Patent
Huth et al.

(10) Patent No.: US 11,349,356 B2
(45) Date of Patent: May 31, 2022

(54) MULTI-TOOTH COIL WINDING FOR A DOUBLE-PHASE ROTATING FIELD MACHINE

(71) Applicant: ebm-papst Mulfingen GmbH & Co. KG, Mulfingen (DE)

(72) Inventors: Gerhard Huth, Hohenroth-Leutershausen (DE); Jens Krotsch, Niederstetten (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 243 days.

(21) Appl. No.: 16/757,384

(22) PCT Filed: Dec. 3, 2018

(86) PCT No.: PCT/EP2018/083377
§ 371 (c)(1),
(2) Date: Apr. 18, 2020

(87) PCT Pub. No.: WO2019/110525
PCT Pub. Date: Jun. 13, 2019

(65) Prior Publication Data
US 2020/0328635 A1    Oct. 15, 2020

(30) Foreign Application Priority Data

Dec. 5, 2017    (DE) ..................... 10 2017 128 827.9

(51) Int. Cl.
*H02K 1/16*    (2006.01)
*H02K 3/12*    (2006.01)
(Continued)

(52) U.S. Cl.
CPC ............... *H02K 1/165* (2013.01); *H02K 3/12* (2013.01); *H02K 3/28* (2013.01); *H02K 21/16* (2013.01)

(58) Field of Classification Search
CPC ................................. H02K 1/165; H02K 3/12
See application file for complete search history.

(56) References Cited

U.S. PATENT DOCUMENTS 2,242,800 A * 5/1941 Olson ...................... H02K 3/28
307/155
2,267,805 A * 12/1941 Appleman ............... H02K 3/28
318/773

(Continued)

FOREIGN PATENT DOCUMENTS

DE         10114014 A1    10/2002
DE     202017103491 U1     7/2017
(Continued)

OTHER PUBLICATIONS

International Search Report (in English and German) and Written Opinion (In German) from PCT/EP2018/083377, dated Feb. 14, 2019; ISA/EP.

(Continued)

*Primary Examiner* — Robert W Horn
(74) *Attorney, Agent, or Firm* — Harness, Dickey & Pierce, P.L.C.

(57) ABSTRACT

The invention relates to a double-phase rotating field machine having a 2p-pole stator with winding teeth (Z), which is designed with a winding arrangement in tooth coil technology, comprising two phase windings (W1, W2, W3), wherein the winding arrangement is formed from wound coil groups (G) with coils nested in one another several times, wherein the coil sections (T) of said coil groups (G) are arranged concentrically surrounding one another from the inside to the outside, and comprise two or a plurality of winding teeth (Z), wherein the respective coil winding numbers are arranged in the grooves (N) between the winding teeth (Z) such that in each case an essentially (Continued)

Figure 1:
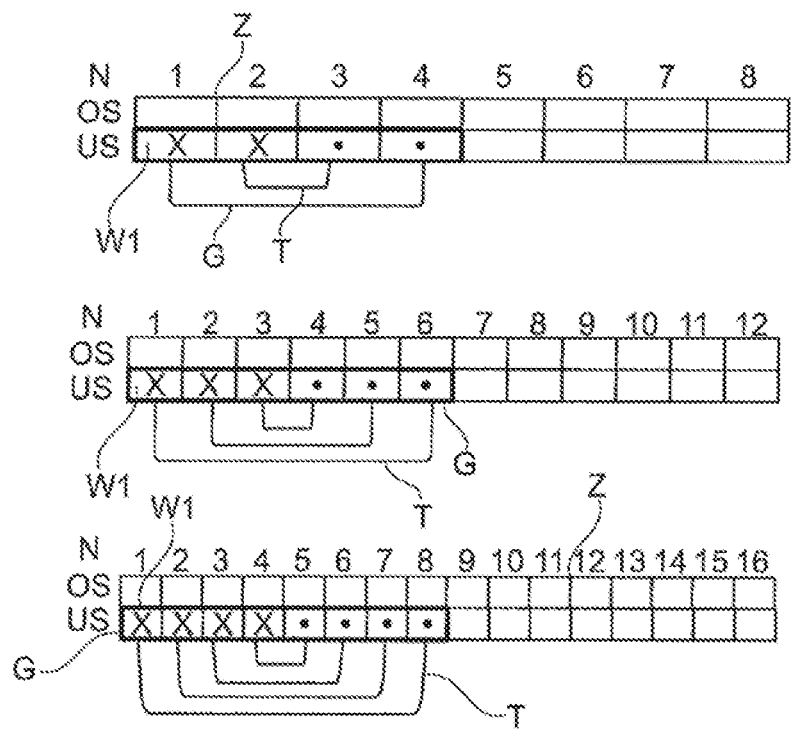

uniform coating of each groove (N) with the same effective total conductor cross section of the coils per groove cross section is given.

10 Claims, 4 Drawing Sheets

(51) Int. Cl.
*H02K 3/28* (2006.01)
*H02K 21/16* (2006.01)

(56) References Cited

U.S. PATENT DOCUMENTS

| | | | | |
|---|---|---|---|---|
| 2,848,680 A * | 8/1958 | Maggs | ............... | H02K 3/28 322/63 |
| 2,947,894 A * | 8/1960 | Strang | ............... | H02K 3/28 310/202 |
| 2,989,654 A * | 6/1961 | Neyhouse | ............ | H02K 3/28 310/203 |
| 3,167,700 A * | 1/1965 | Neyhouse | ............ | H02K 3/28 310/184 |
| 3,324,322 A * | 6/1967 | Johns | ............... | H02K 3/28 310/198 |
| 3,396,290 A * | 8/1968 | Peters | ............... | H02K 3/12 29/605 |
| 3,470,407 A * | 9/1969 | Richer | ............... | H02K 3/28 310/198 |
| 3,622,823 A * | 11/1971 | Broadway | ............ | H02K 3/28 310/179 |
| 3,652,882 A * | 3/1972 | Elliott | ............... | H02K 3/12 310/180 |
| 3,673,477 A * | 6/1972 | Broadway | ............ | H02K 17/14 318/773 |
| 3,780,324 A * | 12/1973 | Greenwell | ........... | H02K 29/03 318/773 |
| 4,462,859 A * | 7/1984 | Nakamura | ............ | H02K 3/28 310/198 |
| 5,486,731 A * | 1/1996 | Masaki | ............... | H02K 3/28 310/68 B |
| 5,519,266 A * | 5/1996 | Chitayat | ............ | H02K 1/16 318/135 |
| 5,723,933 A * | 3/1998 | Grundl | ............... | H02K 29/06 310/266 |
| 5,898,251 A * | 4/1999 | Mochizuki | ........... | H02K 3/28 310/179 |
| 6,170,974 B1 * | 1/2001 | Hyypio | ............... | H02K 3/28 310/179 |
| 6,570,290 B2 * | 5/2003 | Kazmierczak | ......... | H02K 3/12 310/198 |
| 6,710,495 B2 * | 3/2004 | Lipo | ............... | H02K 3/28 310/184 |
| 6,844,648 B2 * | 1/2005 | Luttrell | ............ | H02K 3/28 310/179 |
| 6,857,179 B2 * | 2/2005 | Luttrell | ............ | H02K 15/065 310/179 |
| 6,969,938 B2 * | 11/2005 | Seguchi | ............ | H02K 3/12 310/198 |
| 7,268,455 B2 * | 9/2007 | Kouda | ............... | H02K 3/28 310/201 |
| 8,008,827 B1 * | 8/2011 | Tang | ............... | H02K 3/28 310/184 |
| 8,018,113 B2 * | 9/2011 | Tang | ............... | H02K 3/28 310/198 |
| 8,587,177 B2 * | 11/2013 | Kitamura | ............ | H02K 15/045 310/179 |
| 9,178,395 B2 * | 11/2015 | Qin | ............... | H02K 1/2766 |
| 9,954,406 B2 * | 4/2018 | Ito | ............... | H02K 3/28 |
| 10,574,108 B2 * | 2/2020 | Ren | ............... | H02K 15/068 |
| 10,651,700 B2 * | 5/2020 | Koga | ............... | H02K 3/28 |
| 10,666,104 B2 * | 5/2020 | Koga | ............... | H02K 3/48 |
| 10,826,366 B2 * | 11/2020 | Bailey | ............... | H02K 19/26 |
| 10,848,020 B2 * | 11/2020 | Lan | ............... | H02K 3/28 |
| 10,951,080 B2 * | 3/2021 | Mikail | ............... | H02K 11/21 |
| 11,177,726 B2 * | 11/2021 | Schuler | ............ | H02K 1/182 |
| 2002/0163273 A1 | 11/2002 | Huth | | |
| 2012/0001512 A1 | 1/2012 | Dajaku | | |
| 2012/0043846 A1 * | 2/2012 | Wolfington | ......... | H02K 3/28 310/195 |
| 2012/0228981 A1 | 9/2012 | Dajaku | | |
| 2014/0035425 A1 | 2/2014 | Dajaku | | |
| 2014/0091665 A1 * | 4/2014 | Labbe | ............... | H02K 23/22 310/181 |
| 2017/0054339 A1 * | 2/2017 | Harakawa | ............ | H02K 3/12 |
| 2020/0044505 A1 * | 2/2020 | Bell | ............... | H02K 9/02 |
| 2020/0259382 A1 * | 8/2020 | Sakuma | ............ | H02K 3/28 |
| 2020/0328635 A1 * | 10/2020 | Huth | ............... | H02K 21/16 |
| 2021/0104929 A1 * | 4/2021 | Huth | ............... | H02K 3/28 |

FOREIGN PATENT DOCUMENTS

| | | |
|---|---|---|
| WO | WO-2008044019 A2 | 4/2008 |
| WO | WO-2014033623 A2 | 3/2014 |

OTHER PUBLICATIONS

European Office Action dated Apr. 16, 2021 in corresponding European Application No. 18 814 568.4.

* cited by examiner

MULTI-TOOTH COIL WINDING FOR A DOUBLE-PHASE ROTATING FIELD MACHINE

CROSS-REFERENCE TO RELATED APPLICATIONS

This application is a U.S. National Phase Application under 35 U.S.C. 371 of International Application No. PCT/EP2018/083377 filed Dec. 3, 2018 and published in German as WO 2019/110525 A1 on Jun. 13, 2019. This application claims priority to German Application No. 10 2017 128 827.9 filed on Dec. 5, 2017. The entire disclosures of all of the above applications are incorporated herein by reference.

FIELD

The disclosure relates to a winding arrangement for a 2-strand rotating field machine and to a 2-strand rotating field machine with such a winding arrangement.

Inverter-fed permanent magnet-excited synchronous machines (PM synchronous machines) are used in numerous technical applications. For cost reasons, PM synchronous machines are implemented increasingly with so-called tooth coil windings. The tooth coil technology simplifies the stator design of the PM synchronous machines and additionally enables a segmented stator design. Thus, the stator can be produced in a modular manner in a building block design. In tooth coil windings it is disadvantageous that they form a wide air gap field spectrum that can be more or less interfering depending on the motor design.

In the prior art, different winding concepts for tooth coil windings are already known. The printed publication US 20120228981 A1 aims to reduce a subharmonic with respect to the operating field wave. It proposes to achieve this aim with a multilayer winding consisting of at least two coil sides per groove. The the number of conductors of the coil sides in a first groove is different from the number of conductors of the coil sides in a second groove. Thus, the coils are implemented as tooth coils.

In the printed publication US 20120001512 A1, a stator with a double number of grooves, in comparison to the prior art, is proposed. The coils here enclose, in each case, two teeth. The coils are characterized by a different number of windings with identical coil width.

The printed publication US 20140035425 A1 also relates to reducing undesired upper fields by a winding that can be produced cost effectively. A multilayer tooth coil winding is proposed. The individual coils of a strand have different numbers of windings. The teeth support a different number of tooth coils. This winding topology is also not expedient for small numbers of poles.

In so-called AC line start motors, the line start functionality is necessary. The wide air gap field spectrum of the tooth coil winding has an interfering effect, since, due to the resulting harmonic torques, the startup of the line start motors overall is interfered with or even prevented. Cage rotor motors and PM line start motors can therefore not be reasonably implemented with the tooth coil windings of the prior art.

On the other hand, for example, small PM synchronous motors, that are operated field-oriented on the inverter and are used increasingly in the sector of high rotational speed drives, can in principle be implemented with the tooth coil technology.

An additional basic problem includes the use of the tooth coil winding in the case of low numbers of poles. The principle of tooth coil windings leads to higher numbers of poles. The PM synchronous motors with low number of poles, (for example, 2-pole or 4-pole) for high rotational speed drives, can be implemented only to a very limited extent with the known tooth coil windings.

SUMMARY

Therefore, an object of the present disclosure is to remedy the aforementioned disadvantages and propose a winding topology in the form of a tooth coil winding. It can also be used effectively in the case of low numbers of poles (2-pole and 4-pole). Additionally, it has an advantageous winding field spectrum. Accordingly, there is a need for a winding system for a 2-strand motor design, that is simple and cost effective to produce.

The objective is achieved by the combination of features according to A two-strand rotating field machine with a 2p-pole stator with winding teeth (Z), formed with a winding arrangement in the tooth coil technology, comprising two winding strands (W1, W2), wherein the winding arrangement is formed from wound coil groups (G) with coils which are multiply interleaved, wherein the partial coils (T) of said coil groups (G) are arranged so they concentrically enclose one another from inside to outside and surround two or multiple winding teeth (Z), wherein the respective coil winding numbers in the grooves (N) between the winding teeth (Z) are provided so that in each case a substantially equal occupancy of each groove (N) with the same effective total conductor cross section of the coils per groove cross section is provided.

An underlying idea of the present disclosure includes a tooth coil winding with a specific winding scheme for two strands, preferably with two winding layers, including coil groups with coils that are multiply interleaved and have a continuously changing width. The partial coils of the coil groups are arranged so that they concentrically enclose one another from inside to outside without crossing of the conductors of the partial coils. They surround one or more teeth and have identical or number of coil windings with a substantially equal occupancy of each groove with the same effective total conductor cross section per groove cross section.

The coil groups are arranged diametrically symmetrically with respect to one another. The coil groups partially overlap spatially along the circumference in their arrangement in the winding layers.

Thus, according to the disclosure, a two-strand rotating field machine with a 2p-pole stator with winding teeth and with a winding arrangement in the tooth coil technology comprises two winding strands W1, W2. The winding arrangement is formed from wound coil groups with coils that are repeatedly nested in one another, partial coils. The partial coils of the coil groups are arranged so that they enclose one another concentrically from inside to outside and surround two or more winding teeth. The respective coil winding numbers, in the grooves between the winding teeth, include or are wound so that, in each case, a substantially equal occupancy of each groove with the same effective total conductor cross section of the coils per groove cross section is provided.

The coil groups in the front area do not overlap. Thus, they are designed without crossing conductors, crossing partial coils or coil groups.

The mentioned objective is achieved by a 2-strand "multi-tooth coil winding" that also represents a distributed tooth coil winding. The basic element and thus the common part of such a 2-strand multi-tooth coil winding is a q-fold tooth coil. It, in each case, occupies half of 2*q adjacent grooves of the stator (in the upper layer or the lower layer). The factor q is preferably q=2, 3 or 4.

In an advantageous design of the disclosure, it is accordingly provided that in each case, adjacent winding teeth or grooves of the stator are wound in part with a winding strand. Namely either in the upper layer or in the lower layer.

The number of conductors of a further outward lying partial coil of a coil group is higher or greater than the number of conductors of the inner partial coil concentrically surrounded by the further outward lying partial coil.

In an advantageous design of the disclosure, it is provided that the number of conductors of the partial coils decreases from the outer partial coil to the inner partial coil. In a design that is particularly advantageous, the number of conductors of the partial coils continuously decreases from the outer partial coil to the inner partial coil. In a manner of speaking, the decrease of the number of conductors decreases in equal increments from partial coil to partial coil.

In a particular design, with q=3, exactly 3 partial coils are wound in a multi-tooth coil. The number of the conductors of the partial coils of a multi-tooth coil is distributed as follows:
 a. the outermost partial coil (T): Zo conductors+$\Delta$Z conductors
 b. the central partial coil (T): Zo conductors
 c. the inner partial coil (T): Zo conductors−$\Delta$Z conductors.

Thus, the value Zo represents a predetermined number of conductors in the partial coil. $\Delta$Z represents the difference of the number of conductors in comparison to the respective outer lying or inner lying partial coil.

From the following, additional advantageous designs of the disclosure are characterized in the dependent claims and described in greater detail below together with the description of the preferred embodiment of the disclosure in reference to the figures.

DRAWINGS

The drawings described herein are for illustrative purposes only of selected embodiments and not all possible implementations, and are not intended to limit the scope of the present disclosure.

Figure 2:
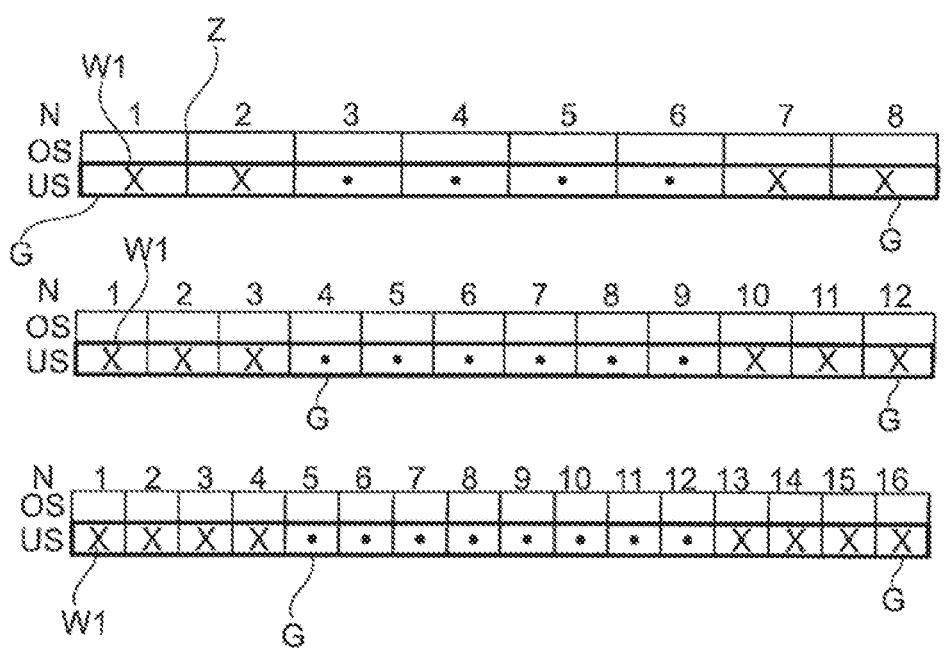
Figure 3:
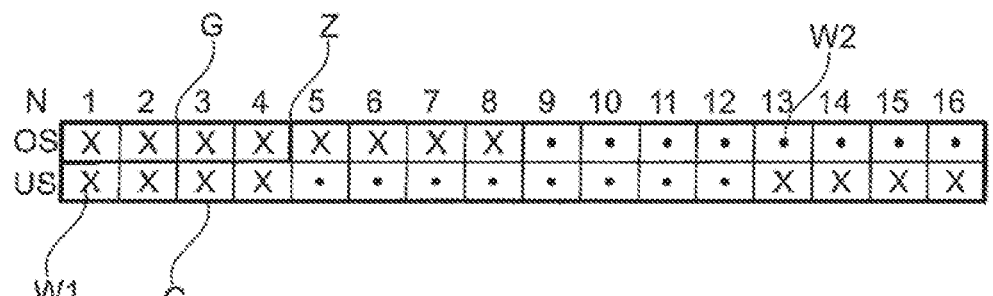
Figure 4:
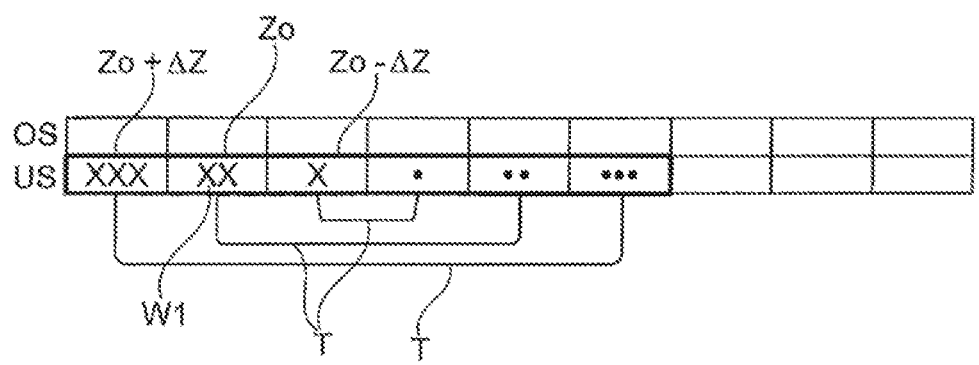
Figure 5:
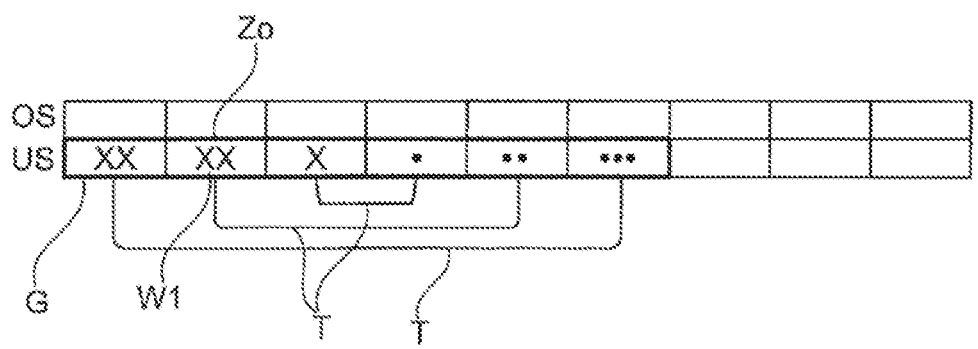
Figure 6:
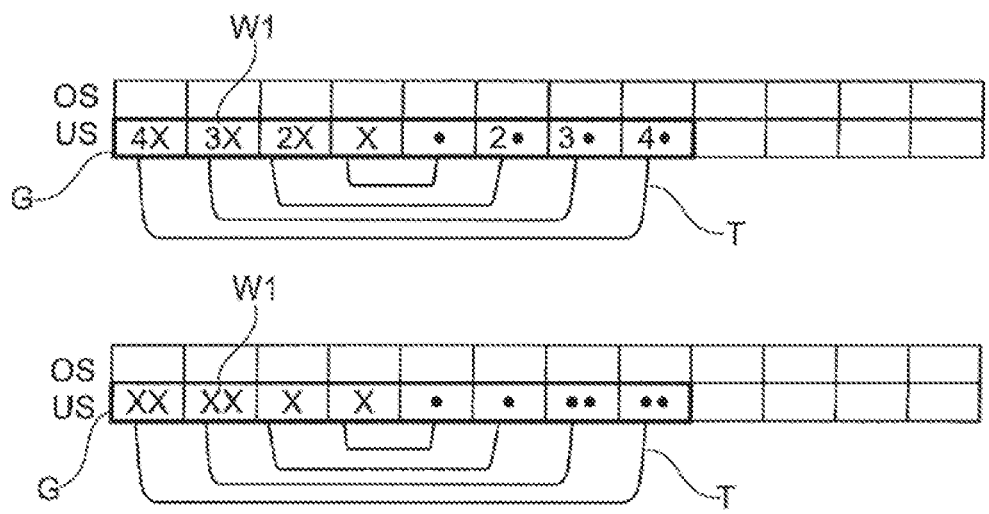
Figure 7:
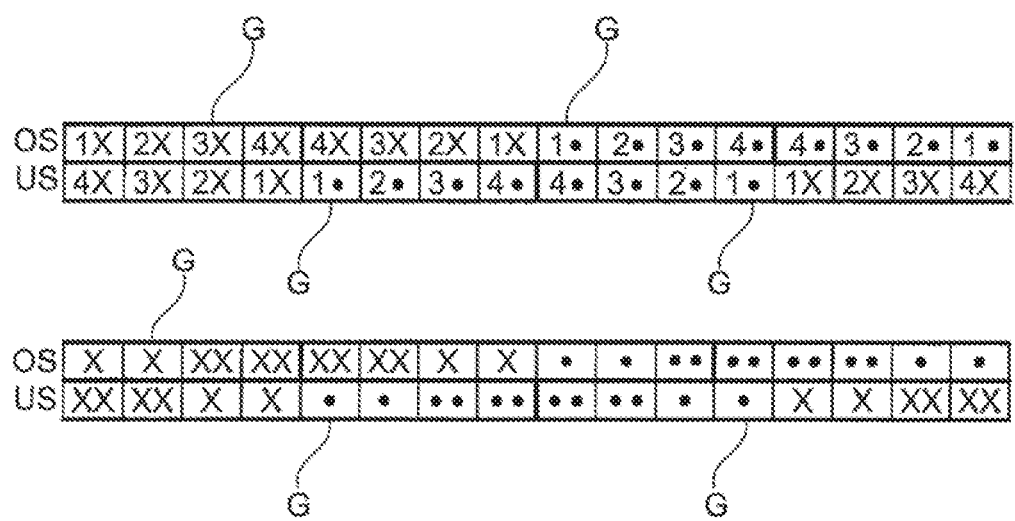
Figures 8, 9, 10:
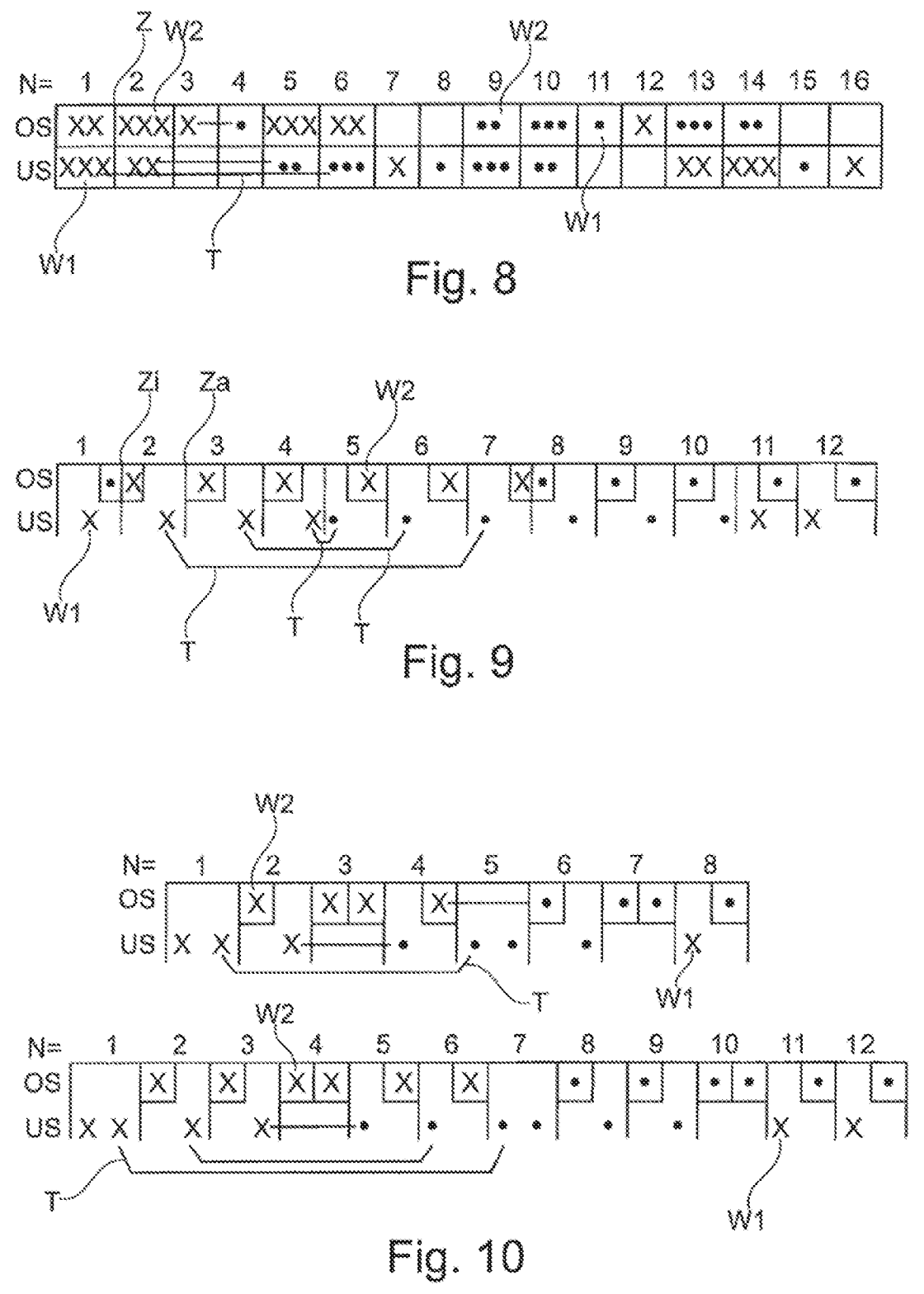

FIG. 1 is a schematic view of a zone plan with marking of the coil guide for the cases q=2, 3 and 4, FIG. 2 is a schematic view of a strand zone plan of a 2-pole, 2-strand tooth coil winding for the cases q=2, 3 and 4, FIG. 3 is a schematic view of a zone plan of a 2-pole, 2-strand tooth coil winding for the case q=4, FIG. 4 is a schematic view of a zone plan with different numbers of conductors for a multi-tooth coil with q=3, FIG. 5 is a schematic view of an alternative design of a zone plan for FIG. 4 with different numbers of conductors for a multi-tooth coil with q=3, FIG. 6 is a schematic view of two zone plans with different numbers of conductors for a multi-tooth coil with q=4, FIG. 7 is a schematic view of a zone plan of a 2-pole, 2-strand tooth coil winding for a multi-tooth coil with q=4 with a decreasing number of conductors but identical groove filling, FIG. 8 is a schematic view of a zone plan of a 2-pole, 2-strand tooth coil winding for a multi-tooth coil with q=3 with windings in the lower layer and upper layer with different numbers of conductors, FIG. 9 is a schematic view of a zone plan of a 2-pole, 2-strand tooth coil winding for the cases q=3 with unequal tooth width, and FIG. 10 is a schematic view in each case of a zone plan of an additional embodiment of a 2-pole, 2-strand incomplete tooth coil winding for the cases q=2 and 3.

DETAILED DESCRIPTION

The disclosure is described in further detail in reference to FIGS. 1 to 10. Identical reference numerals denote identical structural or functional features. Figure is a zone plan with markings of the coil guide for the cases q=2, 3 and 4. X and * represent the winding direction and thus the current direction.

A 2-pole, two-strand rotating field stator with multi-tooth coil winding includes N=2×2q=4q grooves N. In the case of the embodiment examples shown in FIG. 1, means, with q=2 (8 grooves), with q=3 (12 grooves) and with q=4 (16 grooves). Hence, each winding strand W1, W2 according to FIG. 2, includes two multi-tooth coils that can both be located either in the lower layer US or in the upper layer OS. The winding strand in FIG. 2 is in the US. The two multi-tooth coils of a winding strand are offset with respect to one another by exactly one pole pitch, that is to say by N/2p groove pitches, where 2p is the number of poles. In the mentioned embodiment example, by 2q groove pitches, and as a result they are arranged diametrically symmetrically. However, the winding direction and accordingly the current direction of the two multi-tooth coils of the winding strands W1, W2 is reversed. Although the transition to a higher stator groove number increases the winding effort, the upper field behavior and the heat dissipation of the windings over the lamination stack of the stator are improved. Furthermore, a low copper volume of the partial coils enables a simplification during the winding process.

FIG. 2 shows a strand zone plan of a 2-pole, 2-strand tooth coil winding for the cases q=2, 3 and 4. The two winding strands W1, W2 of the 2-pole rotating field winding according to FIG. 3 are offset with respect to one another by N/4p groove pitches. This corresponds to q groove pitches in the embodiment examples. In FIG. 3, the zone plan of a 2-pole, 2-strand tooth coil winding for the case q=4 is represented.

If a rotating field winding with higher pole number is necessary, this can be simply implemented in that the zone plan shown in FIG. 3 is multiplied in accordance with the desired number of pole pairs, that is to say, doubled in the case of a 4-pole winding.

Thus, considering the air gap field spectrum for the embodiment of a 2-strand multi-tooth coil winding, an air gap field spectrum with the following order numbers is excited:

v/p: 1+4*g with g=0, ±1, ±2, ±3, ±4, . . . .

If one considers the groove slot to be negligible, the value of the result is exactly q different winding factors that repeat cyclically as represented in the following table for q=2, 3 and 4.

| v/p | q = 2<br>$|\xi_v|$ | q = 3<br>$|\xi_v|$ | q = 4<br>$|\xi_v|$ |
|---|---|---|---|
| . . . | . . . | . . . | . . . |
| 9 | 0.6533 | 0.2357 | 0.1274 |
| 5 | 0.2706 | 0.1725 | 0.1503 |

| v/p | q = 2 $|\xi_v|$ | q = 3 $|\xi_v|$ | q = 4 $|\xi_v|$ |
|---|---|---|---|
| 1 | 0.6533 | 0.6440 | 0.6407 |
| −3 | 0.2706 | 0.2357 | 0.2250 |
| −7 | 0.6533 | 0.1725 | 0.1274 |
| ... | ... | ... | ... |

It is also possible to implement the q concentric partial coils T of a multi-tooth coil. According to FIG. 1, this represents a repeating common part with different numbers of conductors in order to further improve the air gap field spectrum. Here, it is appropriate to select the different numbers of conductors of the partial coils T in each case so that a groove filling of equal amount is nevertheless achieved in all the grooves.

In order to increase the basic field winding factor, it is necessary to stagger the numbers of conductors of the q concentric partial coils T of a multi-tooth coil. Thus, the number of conductors continuously, i.e., regularly, decreases from the outer partial coil T to the inner partial coil T. This winding state is represented in FIG. 4. For this purpose, FIG. 4 shows a zone plan with different numbers of conductors for a multi-tooth coil with q=3.

Accordingly, FIG. 4 shows an embodiment where is particularly relevant in practice, namely the case with q=3. For all the grooves N of the complete 2-strand rotating field winding, this results in a groove filling of equal amount, if the following staggering of the numbers of conductors is used.

The number of the conductors of the partial coils T of a coil group G is then distributed as follows:

a. the outermost partial coil T: Zo conductors+ΔZ conductors b. the center partial coil T: Zo conductors c. the inner partial coil T: Zo conductors−ΔZ conductors.

In an alternative embodiment, a non-continuous staggering of the numbers of conductors can be selected. For this purpose, FIG. 5 shows an alternative design of a zone plan with different numbers of conductors for a multi-tooth coil with q=3. The resulting rotating field winding is still symmetric. However, the stator grooves do not have a uniform groove filling. For this case of non-uniform groove fillings with unequal numbers of conductors, the partial coils T of a multi-tooth coil winding can be implemented with different winding wire diameters. Thus, the copper volume as well as the groove filling can be increased. The effective total conductor cross section over all the grooves can nevertheless be designed to be largely uniform.

In a particularly advantageous embodiment (not represented), the partial coils T of a multi-tooth coil winding can be formed with the same winding wire diameters but with x parallel connected coils with x-fold number of windings in order to increase the groove filling degree and make it uniform.

In the lower performance range, in 2-pole rotating field machines, the case q=4 is also of high practical relevance. In FIG. 6, two possibilities of conductor staggering are represented. In the complete 2-strand rotating field winding, this leads to an identical groove filling in all the stator grooves.

FIG. 7, in each case, shows a zone plan of a 2-pole, 2-strand tooth coil winding for a multi-tooth coil with q=4 with a decreasing number of conductors but identical groove filling. In the top view, a continuous reduction of the number of conductors occurs. In the bottom view, a zone plan with a nearly continuous decrease of the number of conductors is represented.

A nearly continuously decreasing number of conductors, in which only two different numbers of conductors are used, can always be implemented when q can be divided by 2 to give a whole number, that is to say for q=2, 4, 6, . . . .

If Za denotes the higher number of conductors of the outer partial coils T, and Zi denotes the lower number of conductors of the inner partial coils T, a distribution of the numbers of conductors in the ratio of Zi/Za with a value of approximately 0.41 can be selected. The winding factors of the $3^{rd}$ and $5^{th}$ order are brought to zero and the basic field winding factor can at the same time be increased by approximately 17% as illustrated in the following table for the case q=4.

| v/p | $|\xi_v|$ |
|---|---|
| ... | ... |
| 9 | 0.1493 |
| 5 | 0 |
| 1 | 0.7507 |
| −3 | 0 |
| −7 | 0.1493 |
| ... | ... |

In FIG. 8, a zone plan of a 2-pole, 2-strand tooth coil winding for a multi-tooth coil with q=3 with windings in the lower layer and in the upper layer with different numbers of conductors is shown. In an additional advantageous design, the groove occupancy occurs so that at least one coil of the q partial coils T of a multi-tooth coil is arranged, at least partially, in the respective other winding layer. As represented as an example in FIG. 8, the tooth coils 3-4, 7-8, 11-12 and 15-16 are located in the respective other winding layer US or OS. This has the advantage that a very compact winding head design is possible. Thus, the facing partial coils T can be implemented with a lower number of windings in order to adjust the groove filling with a different winding wire diameter or with a larger number of conductors and at the same time parallel connection.

In another advantageous design, starting from the design according to FIG. 3, the width of the winding tooth Z, that is surrounded by the inner partial coils T of the multi-tooth coil winding, can be reduced in comparison to the adjacent winding teeth. For this purpose, FIG. 9 shows a zone plan of a 2-pole, 2-strand tooth coil winding for the cases q=3 with unequal tooth width.

The solid vertical double lines in the zone plan should be understood to be wide winding teeth Zb. The dashed double lines should be understood to be winding teeth Zs with reduced width.

FIG. 10, in each case, shows a zone plan of an additional embodiment of a 2-pole, 2-strand incomplete tooth coil winding for the cases q=2 (top view) and q=3 (bottom view). In this embodiment, the center partial coil of the multi-tooth coil is omitted. The result is an incomplete multi-tooth coil winding. As can be seen in FIG. 9, for example, the winding teeth with reduced width between groove 1 and 2, 4 and 5, etc., are omitted.

The resulting "chord formation" of the outer partial coil over a groove is avoided. The coil width is now exactly one pole pitch. The basic field winding factor increases. This is similarly possible for the case q>2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A two-strand rotating field machine with a 2p-pole stator with winding teeth (Z), formed with a winding arrangement in the tooth coil technology, comprising: two winding strands (W1, W2), the winding arrangement is formed from wound coil groups (G) that coils which are multiply interleaved, the partial coils (T) of the coil groups (G) are arranged so they concentrically enclose one another from inside to outside and surround multiple winding teeth (Z), the respective coil winding numbers in the grooves (N) between the winding teeth (Z) are provided so that in each case a substantially equal occupancy of each groove (N) with the same effective total conductor cross section of the coils per groove cross section is provided, the number of conductors of a further outward lying partial coil (T) of a coil group (G) is higher than the number of conductors of the inner partial coil concentrically surrounded by this further outward lying partial coil (T).

2. The two-strand rotating field machine according to claim 1, wherein the winding arrangement is designed so that the coil groups in the front area of the winding heads of the coils do not overlap and are wound without crossing partial coils (T) or coil groups (G).

3. The two-strand rotating field machine according to claim 1, wherein the coils have a continuously changing width.

4. The two-strand rotating field machine according to claim 1, wherein the coils of the coil groups (G) are arranged diametrically symmetrically with respect to one another and at least partially overlap spatially along the circumference in the winding layers.

5. The two-strand rotating field machine according to claim 1, wherein, for a coil group (G), a q-fold tooth coil is provided, which in each case occupies half of the 2*q adjacent grooves of the stator with the winding of a winding strand (W1, W2), wherein q=2, 3 or 4.

6. The two-strand rotating field machine according to any claim 1, which in each case adjacent winding teeth (Z) or grooves (N) of the stator, that are wound in part with a winding strand (W1, W2), are wound either in the upper layer (OS) or the lower layer (US).

7. The two-strand rotating field machine according to claim 1, wherein the number of conductors of the partial coils (T) decreases from the outer partial coil to the inner partial coil (T).

8. The two-strand rotating field machine according to claim 6, wherein the number of conductors of the partial coils (T) continuously decreases from the outer partial coil to the inner partial coil.

9. The two-strand rotating field machine according to claim 5 wherein, with q=3, the number of the conductors of the partial coils (T) of a coil group (G) is distributed as follows:
 a. the outermost partial coil (T): Zo conductors+$\Delta$ Z conductors
 b. the central partial coil (T): Zo conductors
 c. the inner partial coil (T): Zo conductors−$\Delta$ Z conductors.

10. The two-strand rotating field machine according to claim 6 wherein, with q=3, the number of the conductors of the partial coils (T) of a coil group (G) is distributed as follows:
 a. the outermost partial coil (T): Zo conductors+$\Delta$ Z conductors
 b. the central partial coil (T): Zo conductors
 c. the inner partial coil (T): Zo conductors−$\Delta$ Z conductors.

* * * * *